2,973,274

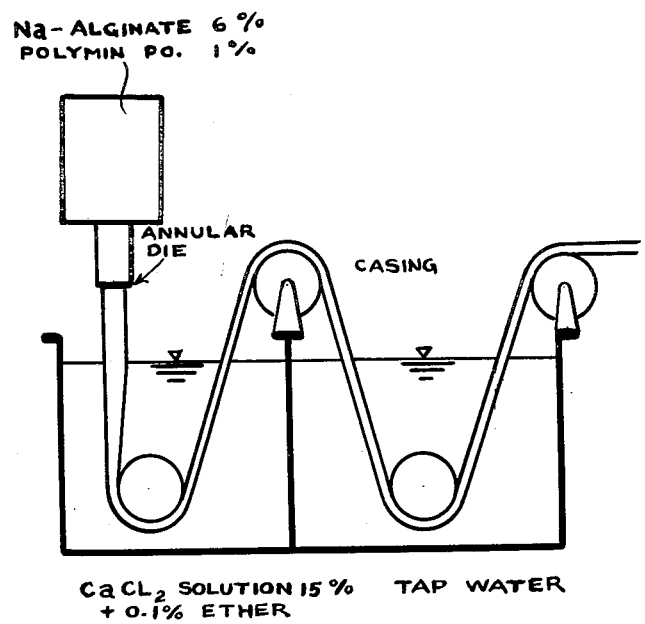

METHOD OF PRODUCING SYNTHETIC SAUSAGE CASINGS

Lothar Langmaack, Walsrode, near Hannover, Germany, assignor to Wolff & Co. Kommanditgesellschaft auf Aktien, Walsrode, Bezirk Hannover, Germany Filed July 3, 1958, Ser. No. 746,348

Claims priority, application Germany July 13, 1957

3 Claims. (Cl. 99—176)

This invention relates to synthetic sausage casings and to a method of producing the same.

Synthetic sausage casings consisting of salts of alginic acid, particularly of calcium alginate, have the familiar characteristic property that their cations, such as the calcium in a calcium alginate synthetic skin, are partly exchanged for sodium whenever such casings come into contact with sodium ions. The common salt contained in the sausage meat and in canned sausage brine is already sufficient to cause part of the calcium to be replaced by sodium. Owing to the partial transformation of the calcium alginate into sodium alginate the casings swell considerably, they become slimy and unattractive in appearance, and their tensile strength is greatly impaired.

Various methods have already been proposed for preventing this undesirable exchange of bases. For instance, it has been found that by using alginates deriving from different kinds of algae, exchange of bases can be reduced, but this imposes awkward limitations upon the selection of raw materials for the manufacture of alginate skins. Another method consists in incorporating an excess of a calcium salt, such as calcium lactate, in the calcium alginate casing, or in partly replacing the common salt in the sausage meat or in the brine by a calcium salt. However, this involves a further operation in the manufacture or in the utilisation of alginate casings.

According to the present invention the problem of preventing the exchange of the base with sodium ions in a synthetic casing produced from salts of alginic acid is solved in a very simple and practicable way by making the synthetic casing wholly or partly of heteropolar simplexes of alginic acid with macromolecular bases and/or cationic polyampholytes. In the course of extensive experimentation made with these macromolecular substances showing basic functions and/or basically reacting groups it was found that in an alginate casing of the said composition, the base exchange, particularly with common salt, is reduced to such an extent as to be practically negligible, and that such an alginate casing can therefore be used without any special treatment of its skin and without special preparation of the brine or of the sausage meat, and also without limitation to a definite prescribed alginate product.

In a synthetic casing in accordance with the invention, it is advisable to make use of substances of the lowest possible equivalent weight and of as high as possible a molecular weight. The equivalent weight can vary between 30 and 300, and, preferably, is less than 100. Suitable substances of high molecular weight are in particular compounds having an average polymerisation degree of at least 20. Suitable macromolecular bases are the polymerisation products of ethylene imine, condensation products of epichlorohydrin and ethylene diamine, a hydroxyethyl polyglucosamine obtained from natural polyglucosamine and ethylene oxide, condensation products of melamine and formaldehyde, condensation products of urea and formaldehyde or generally water- or alkali-soluble basic polymerisation or condensation products containing amino- or imino-groups as carrier of the basic function. As cationic polyampholytes may be used natural polyampholytes (proteins) as well as carboxy methyl polyglucosamine and carboxy methyl polyethylene imine or in general water- or alkali-soluble polyampholytes containing amino- or imino- or guanido-groups and having iso-electric points lying in the alkaline zone (>7). The remaining carboxyl groups of alginic acid not built into the heteropolar simplexes may be wholly or partly replaced by other ions, for instance, by ammonium, sodium, potassium, magnesium, particularly calcium.

Since, unlike their salts, the solutions of macromolecular bases themselves are compatible with alginate as are ampholytes in the anionic state, an advantageous method of producing synthetic casings in accordance with the invention consists in adding the macromolecular bases and/or polyampholytes in anionic form to the extrusible solution of sodium alginate and in then extruding the paste in known manner through an annular die into a precipitation bath containing alginate precipitating reagents such as particularly calcium chloride, copper chloride and/or a diluted mineral acid. Tests have revealed that in precipitation the polybases and/or polyampholytes in question are incorporated.

In the place of sodium alginate there may be used for the spinning solution also another water-soluble alginate i.e. an ammonium or a potassium or a magnesium alginate. The diluted mineral acid may be any mineral acid being stronger than alginic acid which does not have an oxidising, dehydrating, substituting or decarboxylising action.

The necessary charging or re-charging for simplex formation is effected either by precipitation in an acid precipitation bath or by an acid treatment subsequent to the precipitation. In both instances the polybase acquires a positive charge or the sign of the charge of the polyampholyte is reversed. The reaction partners which are now in cationic form react with alginic acid and form heteropolar simplexes. If precipitation is performed solely by means of an acid, then the free carboxyl groups of alginic acid can be wholly or partly transformed into the calcium salt by submitting the casing, after acid precipitation, to a treatment with a solution of a calcium salt, such as calcium acetate and/or calcium hydroxide.

According to the quantity of opposite components present i.e. of the said macromolecular bases and/or the cationic polyampholytes, the carboxyl groups of alginic acid may be wholly or partly saturated by the polybase or polyampholyte and it is possible to control the properties of the product thus obtained by the degree of saturation. The total or partial saturation of the carboxyl groups of alginic acid reduces the degree of swelling of the sausage casing and augments its mechanical strength, and this reduction of swelling and this augmentation of strength takes place with the increase in saturation. The required quantity of polybase or polyampholyte added to the extrusion or casting solution for achieving the desired effect depends upon their equivalent weight and is calculable stoichiometrically therefrom and may preferably be 40 to 100% of the quantity equivalent to that of the alginate. When using, for instance, polyethylene imine with the relatively low equivalent weight of 43, this means about 10 to 25 percent by weight of the quantity of alginate introduced.

In order to avoid difficulties in the extrusion of the solutions due for instance to wetting delay, the precipitation bath may contain a small quantity of surface-active substances. For this purpose suitable reagents are polyethylene imine, diethyl ether, cetyl alcohol either alone or in admixture. The addition quantity of surface active substances is conveniently arranged not to exceed 0.05 to 0.1%.

Apart from the fact that no exchange of the base with sodium ions takes place in a synthetic casing which, in accordance with the invention, consists of a simplex of alginic acid, such a casing also advantageously differs from conventional calcium alginate casings in that its swelling ability in common salt or water is reduced by nearly 90% and that it adheres strongly to sausage meat and assumes the smoky colour and flavour when smoked, to a much greater extent than ordinary casings.

The invention will be illustrated by the following examples:

Example 1

Polyethylene imine (the "Polymin P" of the Badische Anilin & Soda-Fabrik) is added to a 5 to 6% Na-alginate solution in quantities between 0.5 and 1%. The homogeneous solution is extruded from an annular die to form a tubular casing and is then precipitated in a 15% $CaCl_2$ solution of pH=1 to 3. The precipitation bath may contain 0.05 to 0.1% of the polybase and/or ether for improving extrusibility. The swelling factor of the casing after having been rinsed in tap water is between 5 and 8 times (in a 3% solution of common salt). The N-content is between 3 and 5%, the Ca content between 5 and 6.5%. The tensile strength is between 2 and 5 kg./mm². By treating with 1 to 2 n-hydrochloric acid and/or a Ca-acetate or $Ca(OH)_2$ solution, the properties of the casing can be further improved.

Example 2

Products of polyampholytic character are obtained by reacting polyglucosamine or polyethyl imine with chloroacetyl alkali, the position of the iso-electric point depending upon the reaction conditions. A carboxymethyl polyethylene imine is obtained by dissolving 78 g. chloroacetyl sodium in 200 ml. water while heating up to 50° C. and by dropping this solution while stirring into a 25 percent aqueous solution of polyethylene imine heated also up to 50° C. The reaction mixture will be maintained at this temperature of 50° C. for further 30 minutes. The thus obtained carboxymethyl polyethylene imine of the iso-electric point pH=8 is added at pH=9 to a 6 percent Na-alginate solution in quantities of 1 to 5%. Extrusion is as explained in Example 1 and the resultant tubular casing exhibits the same desirable properties as the product obtained according to Example 1.

Example 3

Carboxymethyl polyethylene imine which has been produced according to Example 2 is added together with polyethylene imine in a whole quantity of 1 to 5 percent to a 5 to 6 percent sodium alginate solution. The ratio of carboxymethyl polyethylene imine to polyethylene imine may be choosen at will. The solution is formed and solidified to a tubular casing in the manner proposed by the Example 1 and furnishes a product showing the same favorable quality as the sausage casing resulting from Example 1.

Example 4

A 5 percent sodium alginate solution containing 2 percent polyethylene imine is extruded from an annular die to form a tubular casing and is then precipitated in a coagulating bath consisting of water acidulated by means of HCl up to a pH=3 and maintained at this pH. The formed tubular casing is washed with tap water. This tube consisting entirely of simplexes is eminently suited for use as a sausage casing in view of its improved mechanical strength and reduced swelling degree and base exchange.

The process according to the instant invention is illustrated in the accompanying drawing which is a flowsheet of said process.

What I claim is:

1. A process for substantially preventing the exchange of bases with sodium ions in synthetic sausage casings produced from salts of alginic acid, which comprises adding to a solution of a water-soluble alginate at least one substance in quantities of 40 to 100 percent of the equivalent weight, selected from the group consisting of polymerization products of ethylene imine, condensation products of epichlorohydrin with ethylene diamine, hydroxyethyl polyglucosamine obtained from natural polyglucosamine and ethylene oxide, condensation products of formaldehyde and urea, condensation products of formaldehyde and melamine, carboxymethyl polyglucosamine, carboxymethyl polyethylene imine and proteins in anionic state, and then extruding the ensuing paste through an annular die into a precipitating bath consisting of an aqueous solution of an alginate precipitating reagent of the group consisting of calcium chloride, copper chloride, and dilute mineral acids.

2. A process for substantially preventing the exchange of bases with sodium ions in synthetic sausage casings produced from salts of alginic acid, which comprises adding to a solution of a water-soluble alignate at least one substance, in quantities of 40 to 100 percent of the equivalent weight, selected from the group consisting of polymerization products of ethylene imine, condensation products of epichlorohydrin with ethylene diamine, hydroxyethyl polyglucosamine obtained from natural polyglucosamine with ethylene oxide, condensation products of formaldehyde and urea, condensation products of formaldehyde and melamine, carboxymethyl polyglucosamine, carboxymethyl polyethylene imine and proteins in anionic state, precipitating the ensuing product in a precipitating bath consisting of an aqueous solution of analginate precipitating agent of the group consisting of calcium chloride, copper chloride and dilute mineral acids and also containing 0.05 to 0.1 percent surface-active agents, selected from the group consisting of polyethylene imine, diethyl ether, cetyl alcohol and mixtures thereof.

3. A process for substantially preventing the exchange of bases with sodium ions in synthetic sausage casings produced from salts of alginic acid, which comprises adding to a solution of a water-soluble alginate at least one substance, in quantities of 40 to 100 percent of the equivalent weight, selected from the group consisting of polymerisation products of ethylene imine, condensation products of epichlorohydrin with ethylene diamine, hydroxyethyl polyglucosamine obtained from natural polyglucosamine with ethylene oxide, condensation products of urea and formaldehyde, condensation products of melamine and formaldehyde, carboxymethyl polyglucosamine, carboxymethyl polyethylene imine and natural proteins in anionic state; precipitating the ensuing product in a precipitating bath consisting of an aqueous solution of an alginate precipitating agent of the group consisting of calcium chloride, copper chloride and dilute mineral acids, and also containing 0.05 to 0.1 percent surface-active agents, selected from the group consisting of polyethylene imine, diethyl ether, cetyl alcohol and mixtures thereof and treating the sausage casings thus formed with a calcium salt solution to transform at least part of the free carboxyl groups of alginic acid into calcium salts.

References Cited in the file of this patent

UNITED STATES PATENTS

| | | |
|---|---|---|
| 1,348,459 | Swett | Aug. 13, 1920 |
| 1,415,850 | Erdahl | May 9, 1922 |
| 1,782,887 | Burgess | Nov. 25, 1930 |
| 2,513,416 | Le Gloaher | July 4, 1950 |
| 2,897,547 | Weingand | Aug. 4, 1959 |

FOREIGN PATENTS

| | | |
|---|---|---|
| 506,895 | Great Britain | June 6, 1939 |